April 21, 1931.   H. WEIGAND ET AL   1,802,040
BEATER
Original Filed June 22, 1927
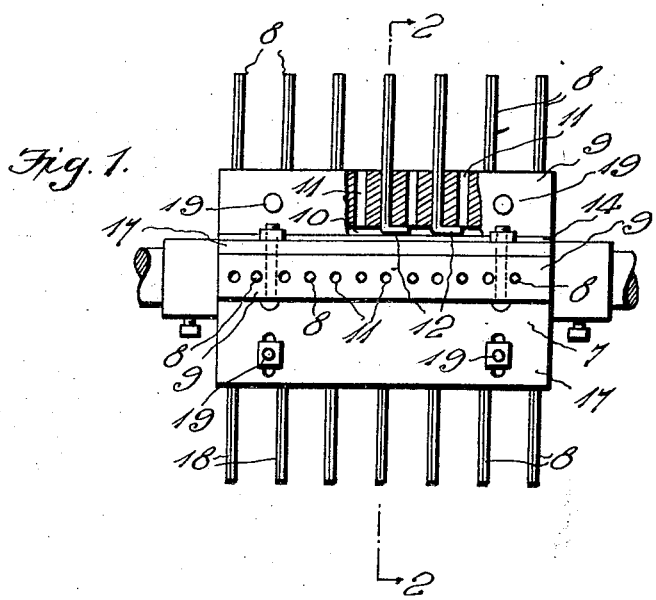
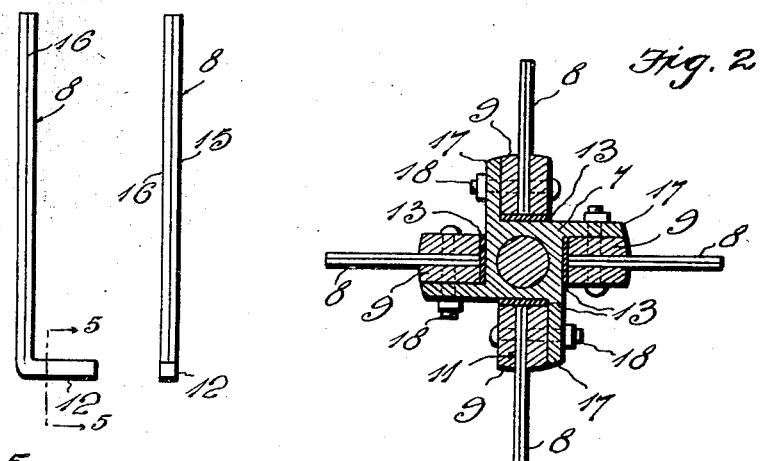
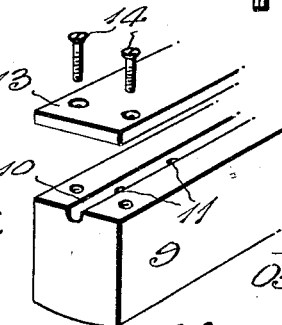
Witness
H. Woodard
Inventors
Henry Weigand
Oscar E. Schobert
By H. R. Willson & Co.
Attorneys Patented Apr. 21, 1931

1,802,040

UNITED STATES PATENT OFFICE

HENRY WEIGAND, OF WILKES-BARRE, AND OSCAR E. SCHOBERT, OF PITTSTON, PENNSYLVANIA, ASSIGNORS TO PENN TOBACCO COMPANY, OF WILKES-BARRE, PENNSYLVANIA, A CORPORATION OF PENNSYLVANIA

BEATER

Original application filed June 22, 1927, Serial No. 200,679. Divided and this application filed March 14, 1929. Serial No. 346,975.

This application is a division of our United States application Serial No. 200,679, filed June 22, 1927.

The present invention relates to a beater for scutching machines or the like, said beater being intended primarily for scutching or removing portions of tobacco leaves from the butt portions of the leaf stems.

It is one object of the invention to provide a beater embodying a plurality of beater arms and unique means for removably securing these arms in place, permitting removal of a worn out set of arms and substitution of a new set, with ease and rapidity.

Another object of the invention is to make novel provision whereby the beater arms may be reversed when the front edges thereof have become badly worn, thereby presenting the unworn rear edges to the work.

A still further object is to provide unique means for holding the arms against turning when in either their original or reversed position.

The beater arms are disposed in a number of groups and the arms of each group are carried by a bar, and it is another aim of the invention to provide means for preventing disconnection of the arms from the bar before securing of the latter to the beater body, which body is rotatable in the present disclosure. Provision is preferably made whereby these arm-carrying bars may be adjusted radially of the beater body so that as the outer ends of the arms are worn away, said arms may be further extended from said body.

With the foregoing and minor objects in view, the invention resides in the novel subject matter hereinafter described and claimed, description being accomplished by reference to the accompanying drawings.

Fig. 1 is a side elevation partly broken away and in section showing a beater constructed in accordance with the invention.

Fig. 2 is a vertical transverse sectional view on line 2—2 of Fig. 1.

Figs. 3 and 4 are side elevations of one of the beater arms, looking in different directions.

Fig. 5 is a transverse sectional view on line 5—5 of Fig. 3.

Fig. 6 is a perspective view of one of the arm-carrying bars and the arm-end-retaining strip in juxtaposition.

In the drawings above briefly described, the numeral 7 denotes a rotatable beater body from which a number of groups of beater arms 8 project, said arms being carried by bars 9, one of which is assigned to each group. One edge of each bar 9 is formed with a longitudinal groove 10 and said bar is also provided with a plurality of arm-receiving openings 11 extending from said groove to the opposite edge of said bar. The arms 8 pass through the openings 11 and are provided with laterally turned inner ends 12 which are snugly received in the groove 10. An arm-end-retaining strip 13 extends over the groove 10 and contacts with the arm ends 12, and this strip is secured to the bar 9 by screws or other desired means 14.

Each arm 8 is polygonal in transverse section or is otherwise shaped to provide it with a sharp front edge 15 and with a similar rear edge 16. When the front edges 14 have become dull from continual contact with the work, the arms may be reversed to present the rear edges 16 to said work, upon removal of the strip 13. This strip is then again secured in place and it will be observed that the construction is such as to hold the arms against turning when in either their original or reversed position. Preferably, the openings 11 are of cylindrical form to permit turning of the arms 8 to their reversed position without the necessity of entirely withdrawing said arms from said openings.

The body 7 is flat-sided and is provided at each of its flat sides with a longitudinal flange 17. The bars 9 are secured by bolts or the like 18 to the inner sides of these flanges and the strips 13 initially abut the flat sides of said body. The flanges 17 however are provided with slots 19 through which the bolts or the like 18 pass and when the outer ends of the arms 8 have worn away, the bolts may be loosened and the bars 9 adjusted outwardly to compensate for the wear.

From the foregoing taken in connection with the accompanying drawings, it will be seen that unique provision has been provided for carrying out the objects of the invention. The details disclosed are preferably followed, but within the scope of the invention as claimed, variations may be made.

We claim:—

1. In a beater, a bar having a longitudinal groove in one edge and openings from spaced portions of said groove to its opposite edge, beater arms passing through said openings and having lateral ends disposed in said groove, and means for removably holding said lateral ends in said groove.

2. In a beater, a bar having a longitudinal groove in one edge and openings from spaced portions of said groove to its opposite edge, beater arms passing through said openings and having lateral ends disposed in said groove, a member extending over said groove for holding said lateral arm ends therein, and releasable means securing said member and bar together.

3. In a beater, a body, a bar secured to said body and having a longitudinal groove in one edge and a plurality of openings extending from said groove, beater arms passing through said openings and having lateral ends held in said groove, and means for holding said lateral ends in said groove prior to attachment of said bar to said body.

4. A structure as specified in claim 1; said arms having sharp edges presented both forwardly and rearwardly, said arms being reversible upon disengagement of their lateral ends from the groove, thereby presenting the unworn rear edges to the work when the front edges have become badly worn, said groove and lateral ends preventing turning of the arms in either their original or reversed position.

5. A structure as specified in claim 1; said arms having sharp edges presented both forwardly and rearwardly, said arms being reversible upon disengagement of their lateral ends from the groove, thereby presenting the unworn rear edges to the work when the front edges have become badly worn, said groove and lateral ends preventing turning of the arms in either their original or reversed position, said openings being cylindrical to permit turning of said arms to reversed position without removal from said openings.

6. A beater arm having a laterally turned anchoring end, said arm having oppositely facing sharp longitudinal edges facing laterally with respect to the length of said laterally turned end.

7. In a beater, an arm-carrying bar having a longitudinal arm-end-receiving groove in one edge and arm-receiving openings from said groove to its opposite edge.

8. A structure as specified in claim 7; together with an arm-end-retaining strip extending over said groove, and means detachably securing said strip to said bar.

In testimony whereof we have hereunto affixed our signatures.

HENRY WEIGAND.
OSCAR E. SCHOBERT.